US011397787B2

(12) United States Patent
Reeves

(10) Patent No.: US 11,397,787 B2
(45) Date of Patent: *Jul. 26, 2022

(54) SCENARIO-BASED INTERACTIVE BEHAVIOR MODIFICATION SYSTEMS AND METHODS

(71) Applicant: Frederick Reeves, Lake Elsinore, CA (US)

(72) Inventor: Frederick Reeves, Lake Elsinore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/898,220

(22) Filed: Jun. 10, 2020

(65) Prior Publication Data

US 2020/0301988 A1 Sep. 24, 2020

Related U.S. Application Data

(63) Continuation of application No. 14/983,210, filed on Dec. 29, 2015, now Pat. No. 10,691,761.

(60) Provisional application No. 62/166,438, filed on May 26, 2015.

(51) Int. Cl.
G06F 16/9535 (2019.01)
G06F 3/04842 (2022.01)

(52) U.S. Cl.
CPC ...... *G06F 16/9535* (2019.01); *G06F 3/04842* (2013.01)

(58) Field of Classification Search
CPC .................................................. G06F 16/9535
USPC ......................................................... 707/734
See application file for complete search history.

(56) References Cited

U.S. PATENT DOCUMENTS

| 8,465,288 | B1 | 6/2013 | Roers |
| 10,691,761 | B2 | 6/2020 | Reeves |
| 2004/0029092 | A1* | 2/2004 | Orr .......................... G09B 7/02 434/354 |
| 2007/0113181 | A1 | 5/2007 | Blattner et al. |

(Continued)

OTHER PUBLICATIONS

Bradshaw et al. "Bullies, Gangs, Drugs, and School: Understanding the Overlap and the Role of Ethnicity and Urbanicity", Accepted: Nov. 8, 2012 / Published online: Nov. 23, 2012 (Year: 2012).*

(Continued)

*Primary Examiner* — Muluemebet Gurmu
(74) *Attorney, Agent, or Firm* — Fish & Richardson P.C.

(57) ABSTRACT

A method for operating a behavior modification software comprises identifying a user profile comprising a behavioral score; presenting an illustration associated with a scenario, the scenario associated with at least one question, each question associated with at least two answers, wherein each answer is associated with a behavior score modifier; receiving selection of a selected question within the scenario; presenting the selected question to a user in response to the selection and at least a subset of the answers associated with the selected question; receiving a selected answer from the user in response to presenting the question; evaluating input from the user based on the behavior score modifier associated with the received selected answer; adjusting the behavioral score based on the behavior score modifier; and determining a path based on the user's adjusted behavioral score, wherein the path identifies a next operation within the behavioral modification software.

13 Claims, 6 Drawing Sheets

(56) References Cited

U.S. PATENT DOCUMENTS

| | | | | |
|---|---|---|---|---|
| 2007/0292835 | A1* | 12/2007 | Hartman | G09B 19/00 |
| | | | | 434/350 |
| 2011/0055267 | A1* | 3/2011 | Bolger | A63F 13/12 |
| | | | | 707/780 |
| 2013/0097701 | A1* | 4/2013 | Moyle | H04L 63/20 |
| | | | | 726/22 |
| 2013/0318469 | A1* | 11/2013 | Wessels | G06Q 50/20 |
| | | | | 715/781 |
| 2014/0074688 | A1* | 3/2014 | Shvarts | G06Q 30/02 |
| | | | | 705/38 |
| 2016/0350311 | A1 | 12/2016 | Reeves | |

OTHER PUBLICATIONS

Street Therapy Interactive, "How Does S.T.I Work," Dec. 7, 2013 [retrieved on May 5, 2016]. Retrieved from the Internet: URL<https://web.archive.org/web/20131207145308/http://streettherapyinteractive.com/how-it-works.php>, 1 page.

\* cited by examiner

SCENARIO-BASED INTERACTIVE BEHAVIOR MODIFICATION SYSTEMS AND METHODS

CROSS-REFERENCE TO RELATED APPLICATIONS

This application is a continuation of U.S. application Ser. No. 14/983,210, filed Dec. 29, 2015, which claims the benefit of U.S. Provisional Application Ser. No. 62/166,438, filed May 26, 2015, which are incorporated in their entirety by reference as if fully set forth herein.

TECHNICAL FIELD

The present disclosure relates to relates to computer software systems and computer-implemented methods for providing an adaptive behavior modification application for encouraging a user to achieve desired social and emotional growth. Behavior modification is a term for describing the use of empirically demonstrated behavior-changing techniques to alter the frequency of behaviors of an individual. Examples of behavior-changing techniques include changing an individual's behaviors and reactions to stimuli through positive and negative reinforcement or by providing stimuli for reducing maladaptive behavior.

SUMMARY

The present disclosure involves systems and computer-implemented methods for providing an adaptive behavior modification software for promoting desirable social and emotional growth in a user, e.g., child user. In one example, a method for operating a behavior modification software comprises identifying a user profile comprising a behavioral score, presenting an illustration associated with a scenario, and receiving a selected question within the scenario. The scenario can be associated with at least one question, where each question is associated with at least two answers. Each answer can be associated with the behavioral score. The method can further include presenting the selected question to a user in response to the selection and at least a subset of the answers associated with the selected question, receiving a selected answer from the user in response to presenting the question, evaluating input from the user based on an behavior score modifier associated with the received selected answer, adjusting the behavioral score in the user profile based on the behavior score modifier, and determining a path based on the user's adjusted behavioral score, wherein the path identifies a next operation within the behavioral modification software program described herein.

While generally described as computer-implemented methods, some or all of the aspects may be implemented as a computer program product embodied on non-transitory, tangible media that processes and transforms the respective data, as well as included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
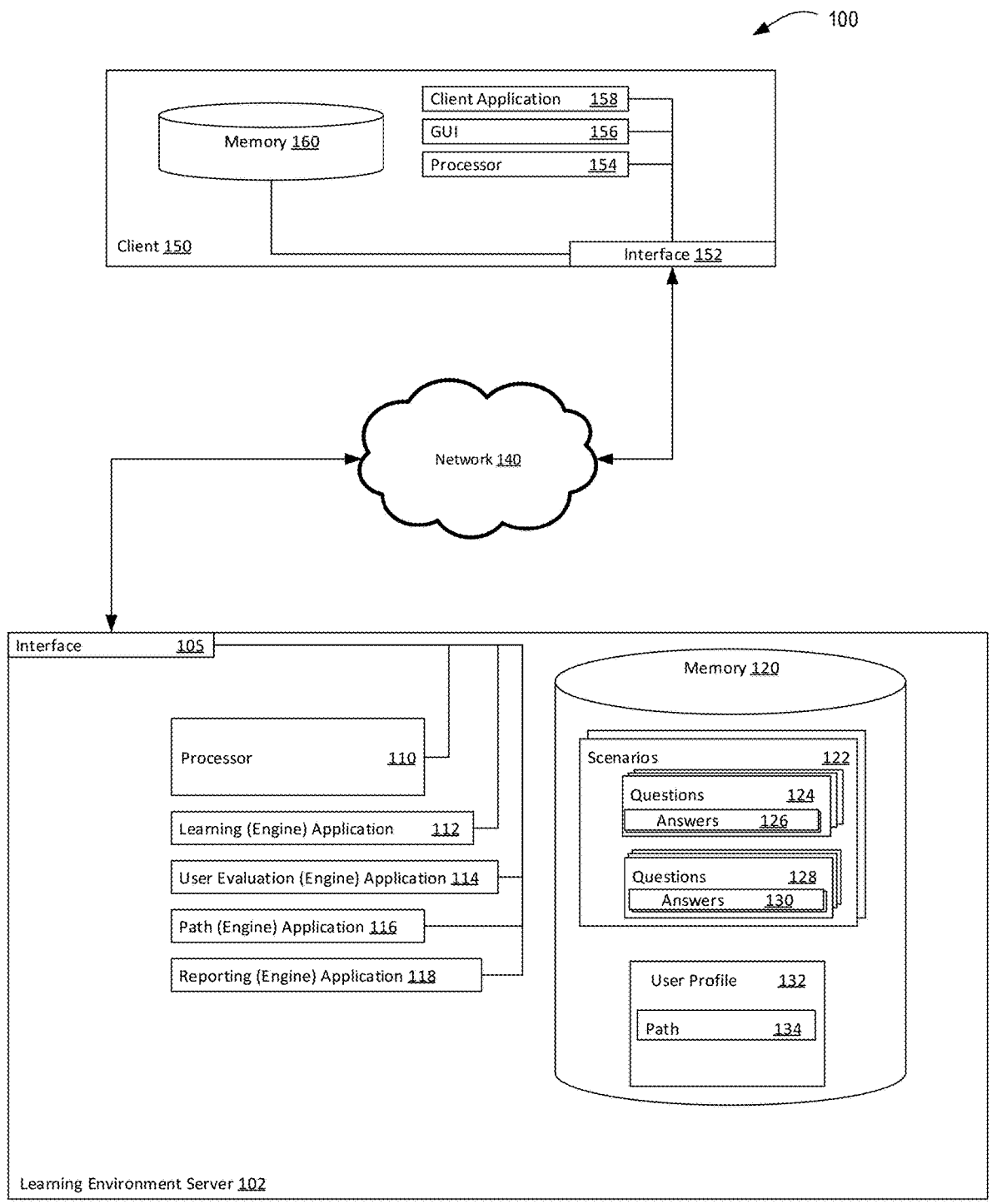
FIG. 1 is a block diagram illustrating an example system for providing an interactive behavior modification software application.

The present disclosure describes a system for providing a behavior modification software for developing and promoting desirable decision-making skills in a targeted user (e.g., a student, a child, a teenager) in various social and behavioral situations. Certain embodiments of the behavior modification software described herein can include applications for providing self-paced, web-based modules for engaging and teaching positive social behavior to the targeted user. The behavior modification software described herein can help to promote many positive attributes that include, but are not limited to positive emotional growth, study skills, conflict resolution, mediation, reflection, journaling, self-affirmation, and goal-setting skills. In particular, the behavior modification software can provide scenarios (i.e., simulated events) that provide a basis for prompting a user to respond to challenging social and/or psychological issues by presenting at least two or more alternative behavioral options to the user. The scenarios described herein guide users toward beneficial learning concepts that include, but are not limited to, promoting practical problem solving, improving self-esteem, and enhancing goal-setting skills. In particular, embodiments described in the present disclosure include providing an interactive software system and method to help a user to develop positive social skills as part of an educational setting, for example, as part of a school curriculum.

The behavior modification software of the systems and methods provided herein may be adapted to address current behavioral and sociological issues that students can face during their schooling years. Issues can relate to bullying, respecting others, peer pressure, and the like. The behavioral modification software described herein can address many important issues and provide them to a user in a self-paced, adaptive program. Some embodiments of the behavioral modification software can provide benefit to a targeted youth user (e.g., from an elementary school student to a high school student or above), such as an adolescent at risk of dropping out of school, a pregnant teenager, a youth who has drug or alcohol abuse issues, or a student struggling with academic underachievement. The targeted user can include youths of various ethnic, cultural, and socio-economic backgrounds, for example, a child living in poverty, or a child struggling to overcome a language-related challenges. The targeted user may be a youth who may have a higher risk of exposure to unemployment, depression, chemical use, and/or incarceration. The behavioral modification software described herein can include a creative, outcome-oriented program for engaging with and providing guidance to a targeted user to help foster better decision-making skills.

Behavior modification software described herein can include "scenarios" to encourage desired behavior in the context of potential behavioral and sociological issues that may be faced by a youth. The "scenarios" are defined as simulated events tailored to challenge a user, e.g., a student, with real issues that they may face today in school, thus guiding the user to make good decisions when in an environment, such as a school environment. The scenarios are adapted to help teach the user how to make sound decisions when the user is faced with various behavioral and/or social issues. The scenarios of the behavioral modification software provided herein are therefore facilitated to help increase the user's self-esteem such that the user will gain confidence and the social skills applicable to any environment. In some embodiments, the behavior modification software described herein includes one or more scenarios adapted to present a student user with a variety of different social issues geared to teaching them how to make good decisions. The behavior modification software described herein can further include "check points" in which information associated with the performance of the user can determine a path identifying a sequence of scenarios within the software. In effect, the software program aims to teach student users how to make good decisions in various social settings associated with a school environment.

FIG. 1 is a block diagram illustrating an example system 100 for providing a behavior modification software that interacts with a user. As illustrated in FIG. 1, system 100 is a client-server system capable of executing behavior modification software comprising one or more scenarios 122 described herein. Although illustrated as a client-server system, any suitable system may be used, including a system comprising a single computer (e.g., client 150 or learning environment server 102) storing a software application, or a cloud-based system accessible via a wired or wireless connection, among others. Specifically, system 100 as illustrated includes or is communicably coupled with a client 150, a learning environment server 102, and network 140. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, learning environment server 102 may be any computer or processing device such as, for example, a blade server, general-purpose personal computer (PC), Mac®, workstation, UNIX-based workstation, or any other suitable device. Moreover, although FIG. 1 illustrates learning environment server 102 as a single system, learning environment server 102 can be implemented using two or more systems, as well as computers other than servers, including a server pool. In other words, the present disclosure contemplates computers other than general-purpose computers, as well as computers without conventional operating systems. Further, illustrated learning environment server 102 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, learning environment server 102 may be any suitable server or system storing a scenario 122 as described herein. The learning environment server 102 is described herein in terms of responding to input received from client 150 as related to the scenarios 122 or the user profile 132, which itself may be associated with one or more software applications, e.g., a learning application 112. However, learning environment server 102 may, in some implementations, be a part of a larger system providing additional functionality. For example, learning environment server 102 may be part of a youth counseling application or application suite providing one or more youth behavioral management systems, social or psychological management systems, counselor-student relationship management systems, and others. In general, the learning environment server 102 and its components, local or remote, manage and guide users through the learning application 112 and its scenarios 122.

As illustrated, learning environment server 102 includes an interface 105, a processor 110, a memory 120 and various software applications that include, but are not limited to, a learning application 112, a user evaluation application 114, path application 116, and a reporting application 118. In general, the learning environment server 102 is a simplified representation of one or more systems and/or servers that provide the described functionality, and is not meant to be limiting, but rather an example of the systems possible.

The interface 105 is used by the learning environment server 102 for communicating with other systems in a distributed environment—including within the environment 100—connected to the network 140, e.g., client(s) 150 and other systems communicably coupled to the network 140. Generally, the interface 105 comprises logic encoded in software and/or hardware in a suitable combination and operable to communicate with the network 140. More specifically, the interface 105 may comprise software supporting one or more communication protocols associated with communications such that the network 140 or interface's hardware is operable to communicate physical signals within and outside of the illustrated environment 100.

Network 140 facilitates wireless or wireline communications between the components of the environment 100 (i.e., between the learning environment server 102 and client(s) 150, between clients 150, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the learning environment server 102 includes a processor 110. Although illustrated as a single processor 110 in FIG. 1, two or more processors may be used according to particular needs, desires, or particular implementations of the environment 100. Each processor 110 may be a central processing unit (CPU), an application-specific integrated circuit (ASIC), a field-programmable gate array (FPGA), or another suitable component. Generally, the processor 110 executes instructions and manipulates data to perform the operations of the learning environment server 102. Specifically, the processor 110 executes the algorithms and operations described in the illustrated figures, including the operations performing the functionality associated with the learning environment server 102 generally, as well as the various software modules (e.g., the learning application 112), including the functionality for sending communications to and receiving transmissions from client(s) 150.

Each of the illustrated applications (e.g., the learning application 112, the user evaluation application 114, the path application 116, and the reporting application 118) represents an application, set of applications, software, software modules, or combination of software and hardware may be used to perform operations related to interacting with the scenario 122. Additional modules and functionality may be included in alternative implementations.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The learning application 112 is a software application that interfaces with a user and performs operations that interact with memory components, e.g., the scenarios 122 and the user profile 132. Information stored in the scenario 122 or the user profile 132 may be associated with and/or relevant to the learning application 112, such that the learning application 112 stores information in or requests information from the scenario 122 or the user profile 132. In some embodiments, the learning application 112 can perform operations including requesting information from the scenarios 122, receiving the requested information from scenarios 122, and interacting with other applications, when appropriate. The learning application 112 may initially assess a set of questions or answers associated with the scenarios 122, and interacts with the other applications (e.g., the user evaluation application 114, path application 116, and/or the reporting application 118) to access the scenario(s) 122) in response to a user's response to a question or an answer selection. The learning application 112 may be associated with one or more other applications (e.g., the user evaluation application 114), or may be a stand-alone application.

The user evaluation application 114 is a software application that can interact with users, applications, and the scenario 122 and/or the user profile 132 to retrieve, update, delete, and analyze data. The user evaluation application 114, in particular, can be an application specifically designed to manage and interact with the user profile 132 stored in the memory 120. For example, the user evaluation application 114 may be able to evaluate a user's response within the scenarios 122 and evaluate the response on a level of correctness with which it is associated. In other words, the user evaluation application 114 can determine whether a user's answer to a question is right or wrong. In response to the determination, the user evaluation application 114 can apply a corresponding behavioral score modifier to the user's response, depending on the level of correctness of the answer, and provide feedback to the system to modify a behavioral score stored in the user profile 132. The behavior score is a numerical representation of the user's performance in selecting correct answers associated with the scenarios 122.

In some embodiments, the user evaluation application 114 can modify a user's performance history based on past modules and stored the performance history information in the user profile 132. The user evaluation application 114 may link identified issues to the selected questions such that performance history data includes sub-categories of data relating to performance specific to one or more identified issues. The user evaluation application 114 may be associated with one or more other applications (e.g., the learning application 112), or may be a stand-alone application.

A path application 116 is a software application that determines a path for sequencing two or more scenarios 122 within the program. The path application 116 can link the scenarios 122 in a pre-determined sequenced order or a randomized order. In some instances, the scenarios 122 may be linked in a semi-randomized order, such that a portion of the order may be pre-determined, while still providing one or more randomized orders. The path application 116 can optionally store and maintain a path location (e.g., the last path location) of a user. For example, in some embodiments, when a user logs into the program, the path location may be uploaded by one or more other applications. In some embodiments, the path application 116 can provide a user, or an administrator, the option of selecting and sequencing the scenarios 122, as desired, within the program. The path application 116 may optionally assist with loading illustrations specific to a particular scenario 122 or a map that shows at least one path location, past path locations, and/or future or other available path locations. The path application 116 may be associated with one or more other applications (e.g., the learning application 112), or may be a stand-alone application.

The reporting application 118 is a software application that can provide a report containing compiled data that includes, but is not limited to, behavioral score(s), scenarios, path locations, identified issues, and software usage time associated with one or more users to a requester, such as a counselor, school administrator, or an individual user. The report may include complied data in the form of a summary table, a graphical representation, or both. The reporting application 118 can optionally provide different reports depending on the requestor. For example, a counselor or a school administrator such as a teacher, may receive a more comprehensive report as compared to an individual user (e.g., a student) requesting information. Some embodiments of the reporting application 118 may keep track of a user's behavioral score as well as the user's responses, for example, the number of correct answers and incorrect answers associated with the scenarios 122. The reporting application 118 can optionally include a database that includes behavioral scores and requested information associated with an individual user (e.g., a student). In some embodiments, the reporting application 118 can provide a requestor with the most recent behavioral module scores of one or more users. Certain embodiments of the reporting application can analyze or compare data associated with one or more user with a standard (e.g., a threshold behavioral score), or data generated from a sampling of a particular group of users (e.g., a normative group of users of a particular age group). For example, in some embodiments, the reporting application 118 can provide a percentile rank of an individual user based on comparative data of an appropriate normative group (e.g., a student with a score at the 65th percentile rank performed as well or better than 65 percent of its normative group). The reporting application may optionally transform data for comparison purposes, for example, transform data into a normal curve equivalent (NCE) normalized score, or a Stanine standardized score.

The reports generated by the reporting application 118 can provide the benefit of informing a counselor or a school administrator of a student's progress in the software program described herein. The reports can provide a graphic representation of the compiled data showing social or psychological areas of improvement, or areas that may need improvement, to motivate and provide a sense of accomplishment in a user. In some embodiments, the reports can include letters, progress reports with behavioral scores, and behavioral score comprehensive summaries. The reporting application 118 may be associated with one or more other applications (e.g., the learning application 112), or may be a stand-alone application. In some embodiments, the reporting application 118 can provide confidential reports to a requestor such a teachers, administrators, and parents, which may optionally include the use of abbreviation or redaction of a student's name and personal information to preserve confidentiality and/or avoid dissemination. In some embodiments, the reporting application 118 can provide reports intended for guardians of the user, e.g., parents.

In some embodiments, the reporting application 118 can analyze a group of users and identify subsets of the group of users based on individual users having a low behavioral score, a common social or psychological area of improvement, or areas requiring improvement. For example, the reporting application 118 can provide a requestor with the benefit of quickly identifying and monitoring a group of users of a particular behavioral score range, thus allowing the requestor to tailor in-class instructions and teachings for a particular group of users.

Still referring to FIG. 1, the learning environment server 102 includes the memory 120, or multiple memories (not shown). The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including the scenarios 122, behavioral/social data, user information, administrative settings, password information, caches, applications, backup data, repositories storing behavioral and/or dynamic information, and any other appropriate information including any parameters, variables, algorithms, instructions, rules, constraints, or references thereto associated with the purposes of the learning application 112 and/or learning environment server 102. Additionally, the memory 120 may store any other appropriate data, such as school or learning facility logs and policies, firewall policies, a security or access log, print or other reporting files, as well as others. For example, illustrated memory 120 includes one or more scenarios 122 and the user profile 132 that contains a path 134, a sequence of two or more scenarios, which will be discussed in later sections.

Client 150 may be any computing device operable to connect to or communicate with learning environment server 102, other clients (not illustrated), or other components via network 140, as well as with the network 140 itself, using a wireline or wireless connection, and can include a desktop computer, a mobile device, a tablet, a server, or any other suitable computer device. In general, client 150 comprises an electronic computer device operable to receive, transmit, process, and store any appropriate data associated with the environment 100 of FIG. 1.

As illustrated, client 150 includes an interface 152, a processor 154, a graphical user interface (GUI) 156, a client application 158, and memory 160. Interface 152 and processor 154 may be similar to or different than the interface 105 and processor 110 described with regard to learning environment server 102. In general, processor 154 executes instructions and manipulates data to perform the operations of the client 150. Specifically, the processor 154 can execute some or all of the algorithms and operations related to requesting information associated with learning application 112 and/or the scenarios 122, including the operations performing the functionality associated with the client application 158 and the other components of client 150. Similarly, interface 152 provides the client 150 with the ability to communicate with other systems in a distributed environment—including within the environment 100—connected to the network 140.

The client 150 executes a client application 158. The client application 158 may operate with or without requests to the learning environment server 102—in other words, the client application 158 may execute its functionality without requiring the learning environment server 102 in some instances, such as by accessing the scenarios 122 (not illustrated) stored locally on the client 150. In others, the client application 158 may be operable to interact with the learning environment server 102 by sending requests via network 140 to the learning environment server 102 for particular portions of the scenarios 122. In some implementations, the client application 158 may be a stand-alone web browser, while in others, the client application 158 may be an application with a built-in browser or network-capable operations. The client application 158 can be a web-based application or a stand-alone application developed for the particular client 150. For example, the client application 158 can be a native iOS application or a desktop application for laptops, as well as others. In some instances, client application 158 may be an agent or client-side version of the learning application 112.

Memory 160 may be similar to or different from memory 120 of the learning environment server 102. In general, memory 160 can store information associated with the client 150 and/or the client application 158. In some instances, memory 160 can store a local version of the scenarios 122, or other scenarios.

The illustrated client 150 is intended to encompass any computing device such as a desktop computer, laptop/notebook computer, mobile device, smartphone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operation of the client application 158 or the client 150 itself, including digital data, visual information, or a GUI 156, as shown with respect to the client 150.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
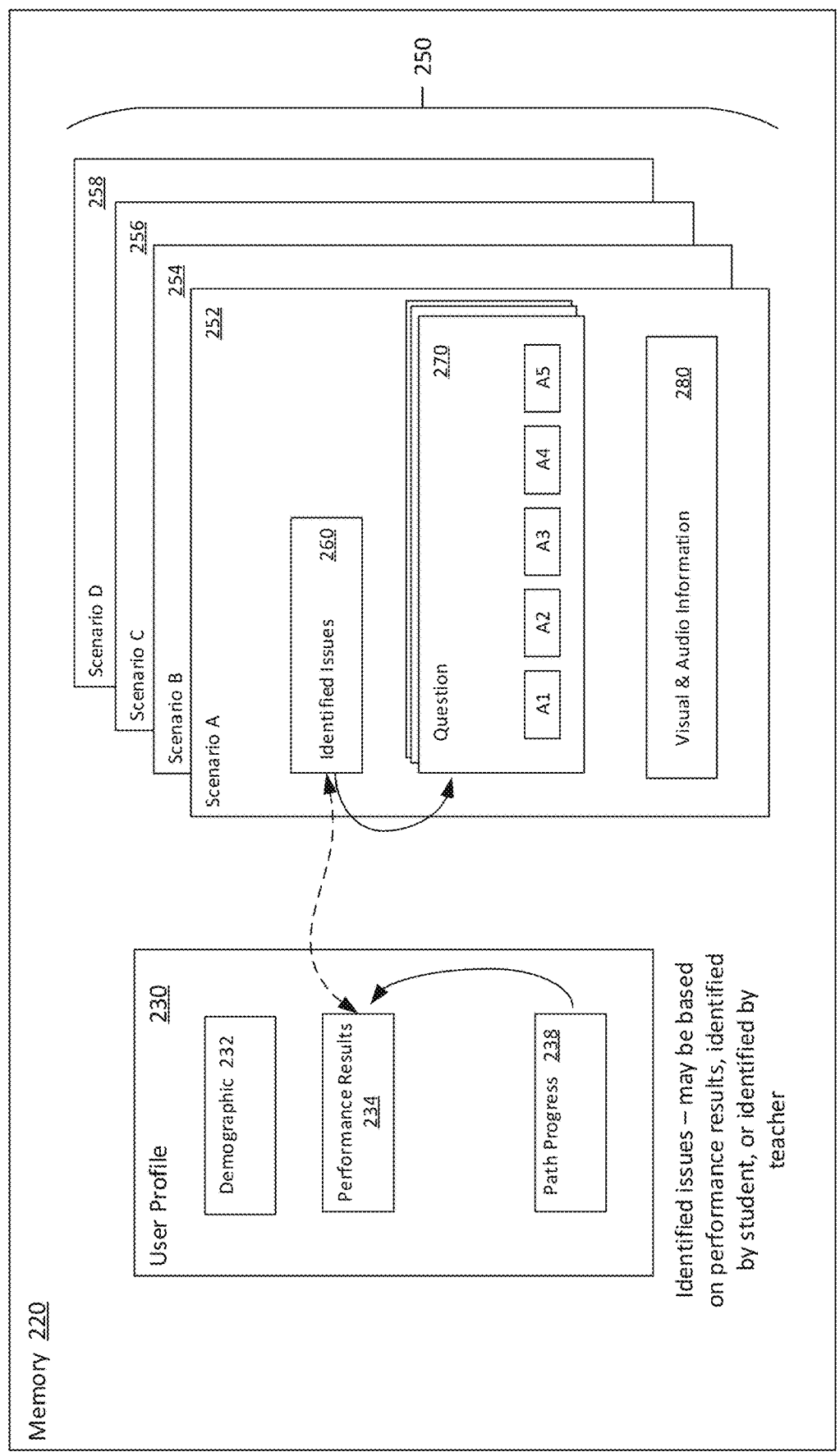
FIG. 2 is a schematic illustration showing an example memory that includes a user profile and a series of scenarios.

FIG. 2 is an illustration of an example memory 220 comprising a user profile 230 and a plurality of scenarios 250. As illustrated, the plurality of scenarios 250 can includes four scenarios (i.e., scenario A 252, scenario B 254, scenario C 256, scenario D 258), each representing a simulated social or behavioral event. Each scenario 252, 254, 256, 258 can include one or more identified issues 260, questions 270, and visual and audio information 280. In some embodiments, the memory 220 can comprise a single memory (as shown), or multiple memories that are local or remote to one another (not shown).

The simulated event associated with each scenario 252, 254, 256, 258 can include at least one question (e.g., question 270 of scenario 252). Each question in the scenarios 252, 254, 256, 258 can be associated with more than one answer (e.g., A1-A5). For example, each question can include two, three, four, five, or more than five answers. The answers can be associated with a corresponding question 270 within the individual scenarios 252, 254, 256, 258. In some embodiments, one answer can be selected by the user. In some embodiments, multiple answers can be selected by the user. Each answer can be associated with a behavioral score that corresponds to the level of correctness of the selected answer. The behavioral score may comprise an absolute value, for example, a numbering scale of 1-10, or the like, or a relative value, for example, a best, a good, a worse, or a worst ranking level.

Each scenario 252, 254, 256, 258 is associated with one or more identified issues. The identified issues 260 can be one or more social or behavioral issues that each question (e.g., the question 270) relates to. For example, in some embodiments, a scenario (e.g., scenario 252) may be associated with an issues such as bullying, peer pressure, and/or drug abuse. Other exemplary identified issues 260 can include one or more various social and/or behavioral issues that include, but are not limited to, bullying, tobacco use, gang affiliation, physical abuse, harassment, peer pressure, leadership, dressing appropriately, sex, drug abuse, use of street language, gossiping, appropriate internet use, safety, snitching, respecting others, stealing, respecting self, studying, conflict resolution, making moral decisions, learning about values, reflection, journaling thoughts, setting goals, and improving focusing and concentration skills.

Each scenario 252, 254, 256, 258 can be associated with visual and audio information 280 for simulating a real-life environment to the user. The applications may be programmed to associate the scenarios 252, 254, 256, 258 with a set of graphics, electronic communication, and video visual aids facilitated to attract and engage with a youth user. For example, in some embodiments, a user can select an avatar to represent the user in the program. Each scenario 252, 254, 256, 258 may be associated with sounds and visual graphics for simulating a particular environment, for example, a school bus. Certain embodiments of the software described herein include two-dimensional graphics or three-dimensional graphics.

The visual information can be optionally tailored to signal to the user an indication of user's level of performance or progression. In some embodiments, certain visual information, e.g., the appearance of a user selected avatar, may change depending on the user's behavioral score or path location. For example, the avatar may develop from a middle school age to a high school age to demonstrate to the user that the user's behavioral score is increasing.

Visual and audio information 280 can be provided to signal to a user that the user has reached a milestone, for example, for having successfully completed a scenario or the entire program. For example, when the user has completed the entire program, visual and audio information 280 can be provided to simulate a graduation ceremony in which the user selected avatar, wearing a graduation cap and gown, receives a diploma prior to the program ending.

As illustrated, the user profile 230 includes demographic information 232, performance results 234, and path progress 238. In general, the user profile 230 links various information of a particular user, and performance data associated with the applications of the behavioral modification software. The user profile 230 provides the client (e.g., the client 150 of FIG. 1) with the ability to use the software without having to re-enter information of a user and to recall and track the progress of the user in the scenarios 252, 254, 256, 258. The user profile 230 can optionally include user and/or administrator preferences. The demographic information 232 of the user can include age, grade, gender, and race of the user.

The performance results 234 can include a behavioral score of the user, and the identified issues 236 of the questions (e.g., question 270) that user has answered previously. In some embodiments, the performance results 234 can include an overall behavioral score. As depicted by the arrow in the figures, the performance results can be associated with one or more identified issues 260. More specifically, the questions and answers within each scenario can be linked to one or more identified issues 260. As such, the performance results 234 can become associated with one or more issue-specific behavioral scores, where each issue-specific behavioral score is a behavioral score associated with an identified issue 236. In turn, the performance results 234 can assist in determining particular issues 260 that may need to be identified for a specific user. As such, the performance results 234 can identify particular issues 260 that may need to be addressed, which are tailored to individual users.

The behavioral modification software described herein can include the path progress 238, which may include "check points" within the software. The path progress 238 can be used to provide and analyze information associated with the current operation of the user and determine a path identifying a next operation within the behavioral modification software. The check points of the path progress 238 can identify the next operation based on the user's behavioral score. For instance, a user who has a behavioral score that reflects a high number of correctly answered questions can be provided with a subsequent operation that includes more challenging scenarios, questions, and/or answers. The next operation can include asking the user another question within the current scenario, leaving the current scenario to enter another scenario, or ending the program. The path progress 238 may provide the benefit of allowing the behavioral modification software to adjust a level of difficulty or subject matter associated with software program (e.g., scenarios and questions related thereto) to each individual user based on the user's performance.

Figure 3:
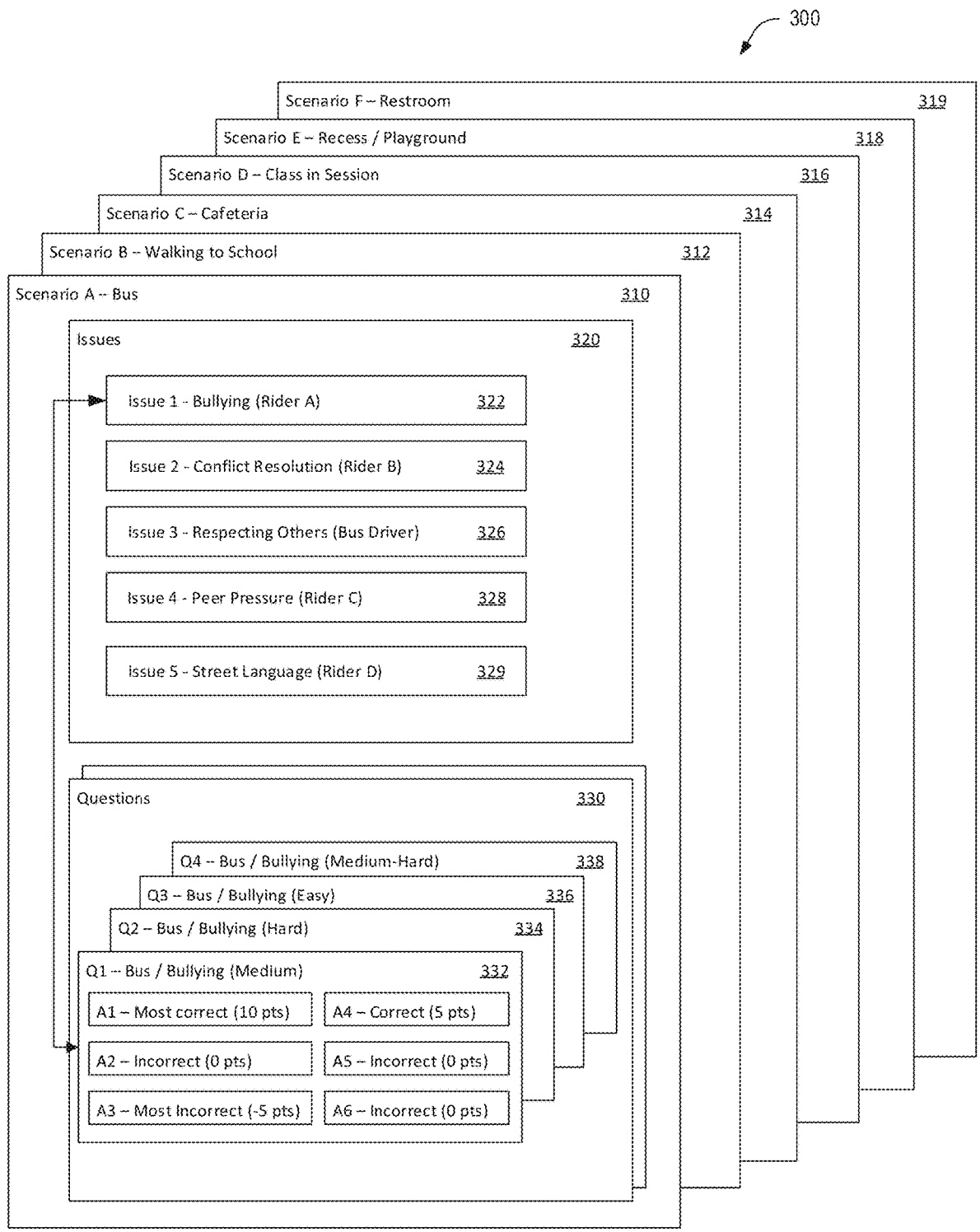
FIG. 3 is a schematic illustration of an example scenario associated with a set of questions and answers.

FIG. 3 is an illustration of an example scenario with various operations performed thereon. As illustrated, the behavioral modification software can include six scenarios, for example, Scenario A 510, Scenario B 512, Scenario C 514, Scenario D 516, Scenario E 518, and Scenario F 519. One or more scenarios, e.g., Scenario A 510, can be associated with a particular simulated environment for simulating a real-life environment that will be familiar to the user. Examples of simulated environments include, but are not limited to a school-related environment, such as riding in a school bus, walking to school, sitting in a cafeteria, playing at recess, being in a classroom or restroom.

As illustrated in FIG. 3, each scenario, e.g., Scenario A, includes five issues relating to a social or behavioral matter. For instance, issue 1 relates to bullying issues, issue 2 relates to conflict resolution, issue 3 relates to respecting others, issue 4 relates to peer pressure, and issue 5 relates to street language. Each issue can include a subset of questions. The subset of questions of each issue can include questions corresponding with varying levels of difficulty. In some embodiments, each issue can include one or more questions associated an easy, medium, medium-hard, or hard level of difficulty. For instance, as illustrated, issue 522 is associated with a first question (Q1 532) having a medium level of difficulty, a second question (Q2 534) having a hard level of difficulty, and such. The level of difficulty of the question presented to the user can be randomly chosen by the software application, or selected based on the behavioral score of the user. In some embodiments, the user or the administrator can preselect a desired level of difficulty for the user, where the preselected level of difficulty is stored in the user profile.

As briefly discussed earlier, each question can be associated with a subset of answers, where there are there might be different levels of answers for the same question. The subset of answers can include one or more correct answers and one or more incorrect answers. The one or more correct answers can each be associated with a behavioral score modifier that has a positive value that has a magnitude that is greater than the behavioral score modifier associated with the one or more incorrect answers. In some embodiments, each answer can have a varying level of correctness that is associated with a behavioral score modifier having a particular sign (i.e., a positive or negative sign) and magnitude. For example, a first correct answer with a higher level of correctness can be associated with a behavioral score modifier that has a larger positive value than another correct answer. Similarly, an incorrect answer that has a higher level of incorrectness can be associated with a behavioral score modifier that has a larger negative (or positive) value than another incorrect answer. The behavioral score modifiers described herein can be mathematically applied to the behavioral score of the user by a formula and a mathematical operator, such as addition, subtraction, multiplication, or division. For example, in some embodiments, the behavioral score modifier may be added to the behavioral score of the user to generate a modified behavioral score that is then stored in the user profile.

Figure 4:
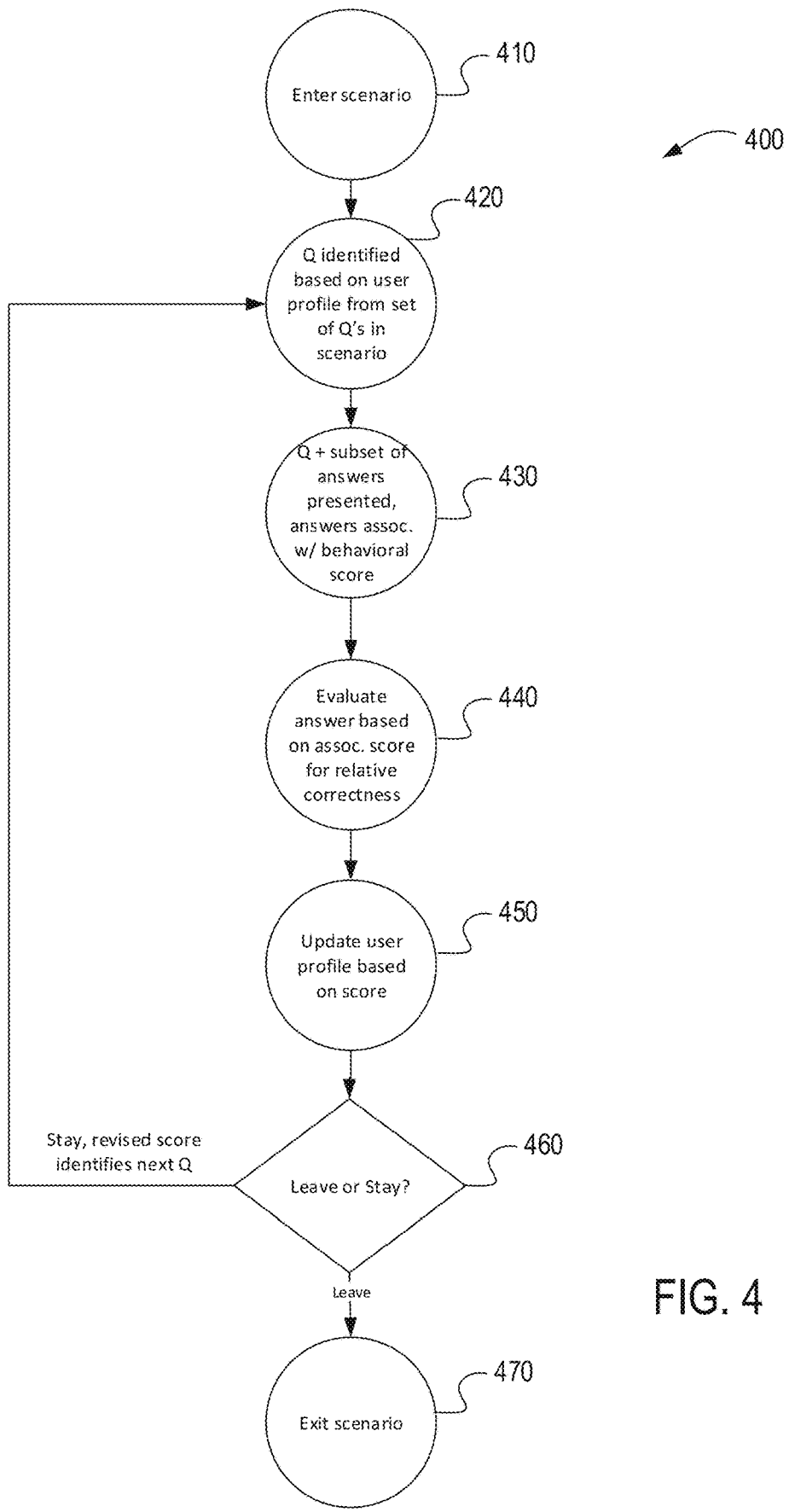
FIG. 4 is a flowchart of example operations associated with a scenario.

FIG. 4 is a flowchart of example operations 400 for identifying a question and evaluating a user's answer within a scenario. For clarity of presentation, the description that follows generally describes method 400 in the context of the system 100 illustrated in FIG. 1. However, it will be understood that method 400 may be performed, for example, by any other suitable system, environment, software, hardware, or a combination of systems, environments, software, and hardware as appropriate.

At 410, a user enters a scenario, e.g., the scenario 122 of system 100. The scenario may be identified in response to inputted user or administrator preferences, or the path progress of the user. The scenario can include one of various environmental settings that include, but is not limited to, a bus environment, or a classroom environment.

At 420, a question within the scenario is identified based on the user profile. The question can be identified to match the needs of the user and/or to match a difficulty level appropriate for the user. For example, the question may be identified based on the user's age such that the question is age-appropriate for the particular user. The scenarios described herein can be adapted to facilitate users of different ages. In another example, the question may be identified in response to inputted user preferences, or an administrator preferences. In yet another example, the question may be identified based on the behavioral score associated with the user that corresponds to the level of difficulty appropriate for the user. In some embodiments, one question is associated with a particular scenario. In some embodiments, one question can be selected from a set of questions associated with a particular scenario.

At 430, a subset of answers are presented to the user that are associated with the identified question, and prompts the user to select at least one answer. The subset of answers can include one or more correct answers and one or more incorrect answers. In some embodiments, one or more answers can include an answer associated with a higher degree of correctness (or incorrectness) than another answer. In some embodiments, the subset of answers are selected based on the user profile. For example, in some embodiments, the subset of answers are chosen based on the user's behavioral score such that the answers match the level of difficulty appropriate for the user.

At 440, an application of the behavioral modification software (e.g., the user evaluation application 114 of FIG. 1) evaluates the user's selected answer(s) based on the associated behavior score modifier and adjusts the user's behavioral score. Each answer is associated with a behavior score modifier. The behavior score modifier can be a positive value, a negative value, or zero. For example, the behavior score modifier may be a positive value for a correct answer, or, alternatively, a negative value or zero for a wrong answer. In some embodiments, the behavior score modifier of two or more answers having either positive or negative values of different magnitudes, where the magnitude of the value reflects a degree of correctness, or incorrectness. For example, an exemplary subset of answers can include a first answer associated with a value of 10, a second answer associated with a value of 5, and a third answer associated with a value of −5. Both the first and second answers can be identified as correct answers, but the first answer may be associated with a higher degree of correctness, and thus has a magnitude that is greater than the magnitude of the second answer.

At 450, the user profile is updated with the adjusted behavioral score by the application of the behavioral modification software (e.g., the user evaluation application 114 of FIG. 1). The updating includes increasing, decreasing, or leave unchanged the user's behavioral score based on the behavior score modifier associated with the user's selected answer. For example, the user's behavioral score can be increased in response to the user selecting a correct answer. Alternatively, in another example, the user's behavioral score can be left unchanged, or be decreased, in response to the user selecting a wrong answer.

At 460, a determination is made to whether the user will leave or stay within the scenario by an application of the behavioral modification software (e.g., the path application). In determining that the user will stay within the scenario, the user's behavioral score may be equal to or lower than the threshold value associated with the scenario, or the user may be below a threshold number of questions associated with the scenario. In such embodiments, the method returns to 420 and continues to identify a next question.

Still referring to method step 460, in determining that the user will leave the scenario, the user's behavioral score may be higher than a threshold value associated with the scenario, or the user has reached a threshold number of questions associated with the scenario. In such instances, the method continues at 470, where the user continues to the next operation within the behavioral modification software program. The next operation can include entering another scenario, or ending the behavioral modification program.

Completion of the behavioral modification program may be optionally followed by facilitated interactions between the user and peers and/or adults to foster self-awareness, reflection, and an increased capacity for empathy, respect, trust, and other social skills that enable the user work cooperatively with others. The behavioral modification program provided herein can provide a self-paced learning tool that can be used as a supplement to interactive group work targeted to teach the user interpersonal skills as well as increase the independence of the user in a classroom community.

Figure 5:
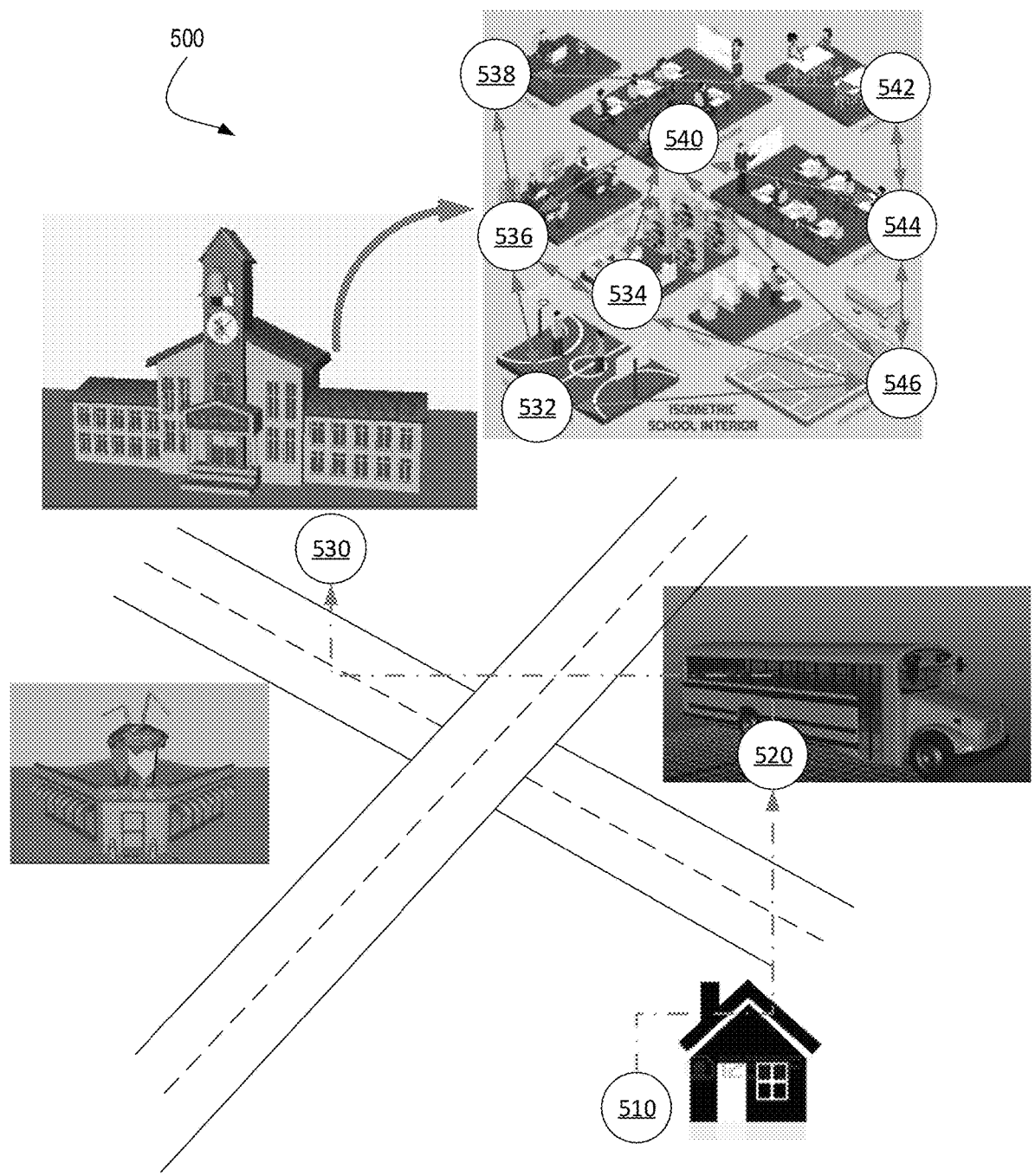
FIG. 5 is an illustration of an example path showing a sequenced series of scenarios.

FIG. 5 is an illustration of an exemplary visual depiction of a path including a plurality of scenarios. At least a portion of the path can include a predefined path in which two or more scenarios are sequenced in a particular order. As illustrated by a path between the first three scenarios 510, 520, 530, the user navigates along the path extending from a home 510 to a bus 520 to a school 530. The order of the scenarios may be predefined as a default setting within an application (e.g., the path application) of the behavioral modification software. In some embodiments, the order of the scenarios can be predefined by an administrator or a user.

At least a portion of the path can include a random path in which two or more scenarios are randomly sequenced. As illustrated by a path within the school area, the user navigates from a playground 532 to various classroom locations and school ground locations 534-546 in a randomized sequence. In some embodiments, the user or administrator may select a plurality of scenarios in which the selected scenarios are then randomly sequenced.

Figure 6:
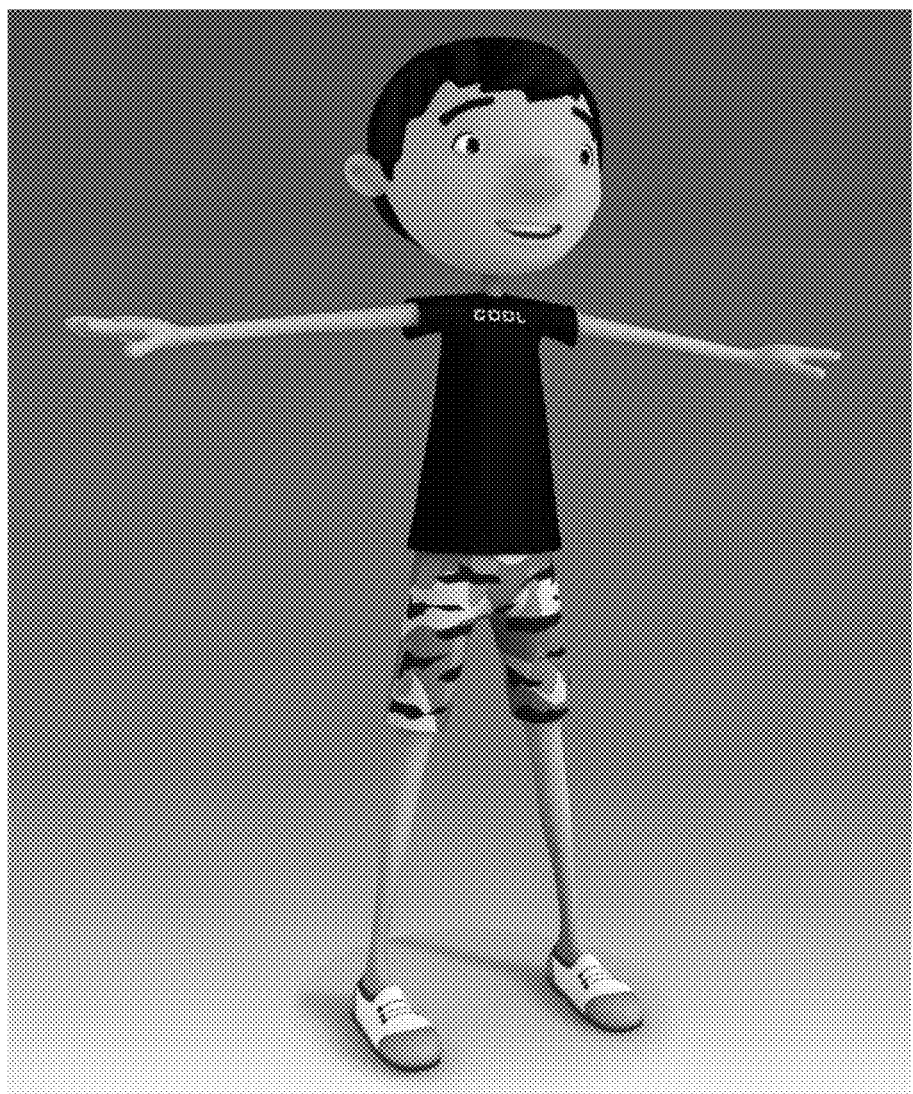
FIG. 6 provides an illustration of an example avatar that can be selected by a user to represent the user in a scenario.

FIG. 6 is an illustration of an exemplary avatar 600 associated with the behavioral modification software. The avatar 600 can be randomly selected or selected by the user from a subset of avatars and thereafter associated with the user profile. A subset of avatars can be selected by the application of the software based on the user profile, for example, a subset of avatars may be selected based upon the age of the user to present a similar age group of avatars to the user.

The following sections relate to how the software system and methods can be used by the user. For example, a user, e.g., student, can log in to a computer creating a user name and password, or using an already created username and password, to begin the behavior modification software. The user can store data associated with the software and their path location such that each time the user logs in, the software program can be able to pick up where the user left off last time. A desired illustration can be associated with a sign-in page, for example, a picture of the schoolhouse with the school bus sitting in front of it.

Once the user has logged in, the user can pick an avatar from a group of avatars to use throughout the program. The program may begin once the user has selected the avatar.

The program can load a first scenario, which begins by showing the selected avatar walking from a home (e.g., a house or an apartment complex) to a school bus. The avatar can be animated and be shown walking out of the front door of a home wearing a backpack and optionally a baseball cap.

The software program can present an illustrated map of the neighborhood and school to the user. The map can be labeled with illustrations showing various locations that the avatar can visit throughout a school day. Each location shown in the map can be used to represent at least one scenario. The one or more scenarios at each location must be completed before the user can move on to another location on the map. Exemplary locations can include the following:

1. Sidewalk between a house and a bus stop
2 School bus
3. School classroom
4. Cafeteria
5. Hallway
6. Restroom
7. Physical education class
8. Cooking class
9. Playground
10. School field trip
11. Special education classroom The map can show the user their current location. The map may appear following a user logging into the program, between scenarios in the program, or by a request from the user.

The scenarios will simulate different real situations that a student might face in today's school system. Each avatar will start off walking out of a home and to a bus, and the avatar will encounter different scenarios that prompt the user to make decisions throughout the entire school day.

In some examples, the avatar can enter the bus and be shown facing other students sitting in the seats of the bus. The bus will be chaotic in which the other students in the bus may be talking, throwing things out of the window, playing, and optionally switching seats on the bus. The game can pause and show the avatar standing next to the bus driver in the front of the bus. The user may be prompted to choose a seat to sit down in.

Each seat row shown in the bus may have one student sitting in it and one open seat. Seat rows may be labeled from 1 to 20 so that the avatar can have a choice of 20 total possible seats to sit down in next to a student, where about 10 seats will be available on each side of the school bus. The other students may be randomly placed throughout the bus either next to the window or in an aisle seat.

Once the user chooses a seat, the avatar will go to the selected seat and sit down next to another student. The program may include animation showing the avatar walking through the bus aisle to the selected sit while some of the other students are wildly playing on the bus. A bubble can pop up with a question from the other student and proposition the avatar. The proposition and possible responses will appear on the screen to be read by the user. An example question asked by the other student may include, "Would you like to throw rocks out of the school bus window at passing cars with me?"

A bubble may be shown containing a set of answers that the user can choose one or more answers from. For example, the set of answers may include:
A. Yes give me a rock
B. That sounds like fun count me in
C. Lets get other kids to help us as well
D. No thank you we could get in trouble and hurt innocent people E. I don't think we should and if you do I'm going to tell the bus driver so he can make you stop In some examples, the avatar can be shown sitting at the cafeteria table with his friends and encountering a bully named Billy. Billy may be illustrated as a plump student wearing a tight shirt two sizes to small, bushy hair, and big arms. Billy may grab the avatar's chocolate milk and takes a quick bite out of the avatar's lunch, e.g., a pepperoni pizza. A dialogue box may pop up, prompting the user to choose one of multiple option to choose from as a response. Example options may include:
A. Avatar grabs another students milk and pours it on Billy
B. Avatar gets up and tells the teacher standing close by that Billy the bully took his lunch.
C. Avatar stand up on the cafeteria table and jumps down on Billy the bully punching him in his face.
D. Avatar ask his friends to help him beat up Billy the bully and whoop his butt.
E. Avatar starts crying in the middle of the lunchroom and saying he wants his mommy.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/ or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

I claim:

1. A computer-implemented method for operating a behavior modification software, the method comprising:
    identifying a user profile comprising a behavioral score and a user selected avatar;
    presenting an illustrated map comprising multiple path locations, each path location associated with a scenario, the scenario associated with at least one question, each question associated with at least two answers, wherein each answer is associated with a behavior score modifier;
    presenting the at least one question to a user within the scenario and at least a subset of the answers associated with the at least one question;
    receiving a selected answer from the user in response to presenting the question;
    evaluating input from the user based on the behavior score modifier associated with the received selected answer;
    adjusting the behavioral score in the user profile based on the behavior score modifier, wherein the behavioral score is increased in response to the user selecting a correct answer, wherein the behavioral score is unchanged or decreased in response to the user selecting a wrong answer;
    determining a path based on the user's adjusted behavioral score, wherein the path comprises an ordered sequence of at least two scenarios; and
    displaying visual information that provides to the user an indication of user's level of performance, wherein the user selected avatar changes its appearance depending on the user's behavioral score or a path location on the map, wherein the appearance of the user selected avatar changes from a first visual representation of the user selected avatar to a second visual representation of the user selected avatar to indicate that the user's behavioral score is increasing, wherein the first visual representation of the user selected avatar is a different visual depiction than the second visual representation of the user selected avatar.

2. The method of claim 1, wherein the user profile includes demographic information, path location information, user preferences, user requests, and administrator requests.

3. The method of claim 1, wherein each scenario associated with a plurality of questions, each question correlated to a behavioral or sociological topic that addresses behavioral or sociological issues that students can face during their schooling years, wherein the behavioral or sociological issues comprise bullying, peer pressure, drug abuse, tobacco use, gang affiliation, physical abuse, harassment, peer pressure, leadership, dressing appropriately, sex, drug abuse, use of street language, stealing, or combinations thereof.

4. The method of claim 3, wherein the user profile identifies at least one preferred behavioral or sociological topic, wherein the questions associated with each scenario are weighted to include the at least one identified preferred topics.

5. The method of claim 4, wherein the behavioral or sociological topic is identified by the user or administrator, or based on prior performance results identified in the user profile.

6. The method of claim 1, wherein the path is stored in the user profile, where determining the path comprises determining a continuation of a previously existing path stored in the user profile.

7. The method of claim 1, wherein the map is labeled with visual illustrations showing multiple path locations comprising a current path location and a past path location, a future path location, or both.

8. The method of claim 7, wherein the multiple path locations comprise a combination of two of more of classroom locations, school ground locations, and school bus locations.

9. The method of claim 1, wherein the path further comprises check points, wherein the check points are configured to identify a next operation based on the behavioral score within the behavioral modification software.

10. The method of claim 9, wherein the next operation is selecting another question or leaving the scenario.

11. The method of claim 9, wherein the next operation is selected based on the behavioral score.

12. The method of claim 1, wherein the determining further comprises the path dynamically adjusting a level of difficulty or subject matter associated with the at least one question based on the user's level of performance.

13. The method of claim 1, wherein the path links the at least two scenarios in a pre-determined sequenced order or a randomized order.

* * * * *